Figure 1:
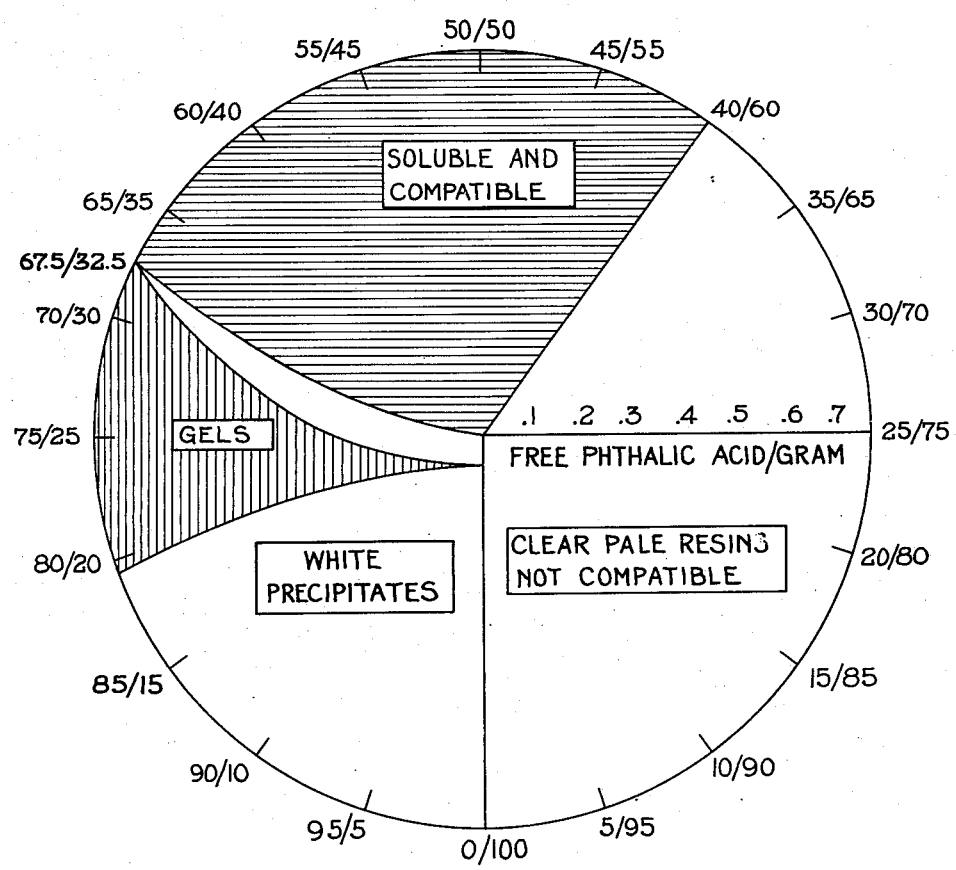

SOLUBLE, GEL, AND PRECIPITATE AREAS OF UREA-FORMALDEHYDE-MODIFIED RESINS.

NOTE: THE FIRST NO. REPRESENTS THE PERCENTAGE OF UREA-FORMALDEHYDE CONDENSATION PRODUCT AND THE SECOND THE PERCENTAGE OF MODIFYING AGENT – FOR EXAMPLE 0/100 = 0% U.F. AND 100% MODIFIER.

Inventors
A. G. Hovey and
P. J. Hodgins

By Munson H. Lane
Attorney

Patented Feb. 22, 1938

2,109,291

UNITED STATES PATENT OFFICE 2,109,291

UREA-FORMALDEHYDE-POLYHYDRIC ALCOHOL-POLYBASIC ACID CONDENSATION PRODUCTS

Almon G. Hovey, Pleasant Ridge, and Theodore S. Hodgins, Detroit, Mich., assignors to Helmuth Reichhold, doing business as Reichhold Chemicals, Detroit, Mich.

Application June 10, 1937, Serial No. 147,568

1 Claim. (Cl. 134—26)

The invention relates to the preparation of coating compositions by reacting urea formaldehyde and a polyhydric alcohol-polybasic acid modifier, preferably in butanol solution.

Urea and formaldehyde would seem to be ideal substances to use for manufacturing coating compositions because they are relatively cheap, light colored, very reactive and stable to light. There are a large number of patents granted on the use of these two materials, but most of them pertain to moulding compositions. A moulding composition is relatively easy to prepare as compared to a coating composition. In preparing coating compositions if the control is not sufficiently accurate, and if a batch should be lost, the lost batch can usually be used in moulding compositions.

The progress towards making a satisfactory coating composition from urea and formaldehyde alone appears to be effectively barred, (1) because of lack of solubility in the commonly used cheap solvents, (2) the tendency for the reaction to continue after the heating has been discontinued and the resin dissolved, (3) the lack of resin compatibility with other widely used commercial resins and materials, such as alkyd resins and drying oils.

It is known that certain combinations of glycerol-phthalate resin have been used as a pH control in the manufacture of urea-formaldehyde moulding compositions. However, there has been no such development of this combination of urea-formaldehyde-glycerol-phthalate as a coating material.

We have found that certain combinations of glycerol-phthalate resins in combination with urea-formaldehyde condensation products make admirable light colored, heat hardening surface coating materials which are free from the manufacturing and storage difficulties we have first enumerated. Unfortunately not all proportions of glycerol-phthalate with respect to urea-formaldehyde are suitable for the purpose. We have found that quite definite limits exist which spell the difference between success and failure. Referring to Figure I of the accompanying drawing, we have found between 0-20% glycerol-phthalate and 80-100% urea-formaldehyde, the tendency to form a white non-resinous precipitate. Between 20-32.5% glycerol-phthalate and 67.5-90% urea-formaldehyde, we have found the tendency towards uncontrollable reaction and very rapid gel formation. However, between 32.5-60% glycerol-phthalate and 40-67.5% urea-formaldehyde, we find a very favorable field where butanol solutions of the co-condensation product are compatible with commercial alkyd resin solutions and cheap solvents, such as, mineral spirits. In this field the process is controllable in contrast to what occurs in the two areas first described. When the proportions of glycerol-phthalate are still further increased between 60-100% glycerol-phthalate and 0-40% urea-formaldehyde, clear pale resins are obtained which are soluble in butanol, but which are not compatible with commercial alkyd resins. Some of these proportions may be miscible with commercial alkyd resins in solution form, but in films when the solvents have evaporated they show white due to the incompatibility of the resins themselves.

When one makes a few isolated experiments using various proportions of glycerol-phthalate to modify the urea-formaldehyde, very contradictory results are obtained if the proportions vary on a wide range and the observer would be apt to think there is no definite relation between the two results obtained. After numerous experiments, however, it was possible to map out the areas shown in Figure I. Table I shows some of the more pertinent experiments which led up to the mapping out of the areas shown in Figure I:—

Table I

| Exp. No. | Percent urea formaldehyde | Percent modifying agent | Acid No. | Free phthalic acid/gr. | Remarks |
|---|---|---|---|---|---|
| T-39 | 54 | 46 | | | Resin O. K. |
| T-89 | 100 | 0 | 28.0 (R)* | | Resin clear gel. |
| T-90 | 100 | 0 | 49 (R) | | Resin white ppt. |
| T-137 | 58 | 42 | 165 (M)* | 0.436 | Resin O. K. |
| T-139 | 90 | 10 | 165 (M) | 0.436 | Resin white ppt. |
| T-140 | 41 | 59 | 165 (M) | 0.436 | Resin O. K. |
| T-141 | 80 | 20 | 165 (M) | 0.436 | Resin clear gel. |
| T-143 | 40 | 60 | 36 (M) | 0.095 | Resin clear, straw color. |
| T-145 | 0 | 100 | 72 (M) | 0.1901 | Resin clear, no compatibility. |
| T-146 | 80 | 20 | 72 (M) | 0.1901 | Resin white gel. |
| T-152 | 70 | 30 | 198 (M) | 0.528 | Resin white gel. |
| T-153 | 70 | 30 | 126 (M) | 0.332 | Resin O. K. |
| T-153 B | 74 | 26 | 126 (M) | 0.332 | Resin white gel. |
| T-155 | 40 | 60 | 165 (M) | 0.436 | Resin O. K. |
| T-156 | 25 | 75 | 165 (M) | 0.436 | Resin clear, no compatibility. |

Note*:—R=Resin, M=Modifying agent.

Table II

| *UF/Modifier ratio | Range free phthalic acid gram | Type of area |
|---|---|---|
| 0 UF/100 M to 25 UF/75 M. | 0-.80 | Clear, pale resins, but not compatible with alkyd resins. |
| 25 UF/75 M to 40 UF/60 M. | 0-.80 | Clear, soluble and compatible with alkyds, but decreasing to no compatibility as the 25 UF/75 M ratio is approached. |
| 40 UF/60M to 67.5 UF/32.5 M. | 0-.80 | Clear, soluble and compatible with alkyds. |
| 67.5 UF/32.5 M to 80.5 UF/19.5 M. | 0-.80 | Clear gel area, with white and cloudy gels on the border lines. |
| 80.5 UF/19.5 M to 100 UF/0 M. | 0-.80 | White precipitate area. Formation of mono and dimethylol compounds. |

* UF = Urea-formaldehyde.

Table II is a word description of the areas shown graphically in Fig. I of the drawing.

Within the limits of the favorable area it is possible to make water-white, heat-hardening adhesive films which bake out hard and hold their color exceptionally well during the bake even if the temperature is as high as 350–400° F. As an operating example of how a resin of this character may be prepared:—

Example I (a) Preparation of the glycerol-phthalate compound: 3 mols (444 parts by weight) phthalic anhydride are heated with 4 mols (368 parts by weight) of C. P. glycerine. These ingredients are cooked at 190° C. until a pill is clear on glass, or until the acid number is between 150–170. This usually requires 15–20 minutes at the top temperature for a small batch. For larger batches there is a tendency for a longer time to be required in order to arrive at this condition. At this stage the modifying compound is allowed to cool. The resulting very thick, water-white, clear, transparent resinous material is now ready for use in combination with the urea-formaldehyde.

(b) Preparation of the final coating composition. The following ingredients are weighed out into a processing kettle which may be equipped with agitation, reflux condenser, steam heat, and capable of withstanding vacuum and pressure.

|  | Parts by weight |
|---|---|
| Glycerol-phthalate interaction product described in (a) | 81 |
| Urea | 80 |
| Formaldehyde (37% CH₂O) | 520 |
| Butanol | 320 |

This material is refluxed for 2 hours at boiling and then vacuum distilled until all traces of water are removed. Additional butanol is added to compensate for the butanol lost in removing the water by the vacuum distillation and to bring the solids to 60% by weight of resin and 40% of butanol. The butanol which was vacuum distilled off may be recovered by customary methods.

Example II (a) Preparation of the glycol-phthalic compound:—1 mol. (148 parts by weight) phthalic anhydride is heated with 2 mols (124 parts by weight) of chemically pure ethylene glycol. These ingredients are cooked at 165–200° C. until a pill is clear on glass, or until the acid number is between 120–130. This usually requires 15–20 minutes at the top temperature for a small batch. When cooled the resulting resinous heavy syrup is clear, transparent and light in color.

(b) Preparation of the final coating composition is carried on in much the same manner as described in Example I, the composition being as follows:—

|  | Parts by weight |
|---|---|
| Glycol-phthalate interaction product described in (a) | 32 |
| Formaldehyde (37% CH₂O) | 162 |
| Urea | 60 |
| Butanol | 100 |

The properties of this resin composition are very similar to those described in Example I.

The butanol seems to be the only solvent which gives a satisfactory solution of this condensation product which will tolerate large amounts of cheap hydrocarbon solvents, not only the coal tar type, but also the low solvent power petroleum type. It is necessary that the process be carried out in the presence of butanol in order to prevent the reaction from running away and forming an insoluble gel. The same resin when prepared without butanol even at low temperatures tends to be cloudy or insoluble when it is attempted to dissolve it in butanol.

It is to be understood that the use of other polybasic acids than phthalic and other polyhydric alcohols than glycerine come within the scope of this invention. Furthermore, it is to be understood that a substitution of a certain amount of the polyhydric alcohol by monohydric alcohols, such as, butanol and amyl alcohol in the preparation of the modifier also come under the scope of this invention, furthermore, that certain monobasic acids may be used in place of some of the polybasic acids.

We have found that the substitution of many of these various ingredients for the glycerine and phthalic anhydride in the modifier do not appear to make any very substantial changes in the area of compatibility shown in Figure I, which is based on the use of the glycerol-phthalate modifier described in the example.

We claim:—

A coating composition comprising the product of reaction of a urea-formaldehyde condensation product and an unmodified polyhydric alcohol-phthalic anhydride modifier, said reaction product consisting of a quantity of modifier within the range of 32.5%–60.0% and a quantity of urea-formaldehyde condensation product falling within the range of 40.0%–67.5%, an excess of polyhydric alcohol of 100% over the theoretical proportion being employed in the modifier, and the molecular ratio of formaldehyde to urea being at least 2–1, the reaction being carried out in the presence of butanol.

ALMON G. HOVEY.
THEODORE S. HODGINS.